(12) United States Patent
Eidt (10) Patent No.: US 9,912,642 B1
(45) Date of Patent: Mar. 6, 2018

(54) AUTHORIZATION PATH SECURED ELECTRONIC STORAGE SYSTEM

(71) Applicant: Erik L. Eidt, Campbell, CA (US)

(72) Inventor: Erik L. Eidt, Campbell, CA (US)

( * ) Notice: Subject to any disclaimer, the term of this patent is extended or adjusted under 35 U.S.C. 154(b) by 214 days.

(21) Appl. No.: 14/796,951

(22) Filed: Jul. 10, 2015

(51) Int. Cl.
*G06F 7/04* (2006.01)
*H04L 29/06* (2006.01)

(52) U.S. Cl.
CPC .......... *H04L 63/0281* (2013.01); *H04L 63/08* (2013.01); *H04L 63/105* (2013.01)

(58) Field of Classification Search
CPC .... H04L 63/0281; H04L 63/08; H04L 63/105
See application file for complete search history.

(56) References Cited

U.S. PATENT DOCUMENTS

| 2002/0073136 A1* | 6/2002 | Itoh | H04N 7/17318 |
| | | | 709/200 |
| 2010/0186082 A1* | 7/2010 | Ladki | G06F 21/335 |
| | | | 726/19 |
| 2013/0086645 A1* | 4/2013 | Srinivasan | H04L 63/10 |
| | | | 726/4 |
| 2015/0089569 A1* | 3/2015 | Sondhi | H04L 63/08 |
| | | | 726/1 |
| 2016/0337369 A1* | 11/2016 | Sanso | H04L 67/1097 |

\* cited by examiner

*Primary Examiner* — Baotran N To
(74) *Attorney, Agent, or Firm* — TIPS Group (57) ABSTRACT

A secure electronic storage system includes an authentication gateway, a user/system interface coupled to the authentication gateway, a secure digital storage including a plurality of memory blocks (Containers) that store at least one information resource (Fact), wherein a target Container can only be accessed by a Fact comprising a valid authorization path (Authorization), and a memory controller coupling the user/system interface to the secure digital storage. In a non-limiting example embodiment, the memory controller is operative to: (a) manage the creation, sharing and unsharing of Containers; and (b) determine if a request to access a target Container includes a valid Authorization for that Container.

8 Claims, 6 Drawing Sheets

AUTHORIZATION PATH SECURED ELECTRONIC STORAGE SYSTEM

BACKGROUND

Authorization is the function of specifying access rights to resources related to information security and computer security. More formally, "to authorize" is to define an access policy. For example, human resources staff is normally authorized to access employee records and this policy is usually formalized as access control rules in a computer system. During operation, the system uses the access control rules to decide whether access requests should be approved (granted) or disapproved (rejected). Resources include individual files or an item's data, computer programs, computer devices and functionality provided by computer applications.

Access control in computer systems and networks rely on access policies. The access control process can be divided into two phases: 1) a policy definition phase where access is authorized, and 2) a policy enforcement phase where access requests are approved or disapproved. Authorization is thus the function of the policy definition phase which precedes the policy enforcement phase where access requests are approved or disapproved based on the previously defined authorizations.

Most modern, multi-user operating systems include access control and thereby rely on authorization. Access control also uses authentication to verify the identity of users. When a user tries to access a resource, the access control process checks that the user has been authorized to use that resource. Authorization is typically the responsibility of an authority, such as a department manager, but is often delegated to a custodian such as a system administrator. Authorizations are expressed as access policies in some types of "policy definition application", e.g. in the form of an access control list or on the basis of the "principle of least privilege" where users are only authorized to access whatever they need to do their jobs. Older and single user operating systems often had weak or non-existent authentication and access control systems.

"Anonymous users" or "guests" are users that have not been required to be authenticated. They often have limited authorization. On a distributed system, it is often desirable to grant access without requiring a unique identity, e.g. with the use of an access token. Familiar examples of access tokens in the real world include keys and tickets which grant access without proving identity.

Trusted users are sometimes authorized for unrestricted access to resources on a system, but must be authenticated so that the access control system can make the access approval decision. "Partially trusted" and guests will often have restricted authorization in order to protect resources against improper access and usage. The access policies in some operating systems, by default, grant all users full access to all resources. Others do the opposite, insisting that the administrator explicitly authorizes a user to use each resource.

Even when access is controlled through a combination of authentication and access control lists, the problems of maintaining the authorization data is not trivial, and often represents as much administrative burden as managing authentication credentials. It is often necessary to change or remove a user's authorization: this is done by changing or deleting the corresponding access rules on the system. Using atomic authorization is an alternative to per-system authorization management, where a trusted third party securely distributes authorization information.

Authorization-based security has been around for a while and typically works as follows. It uses some authorization token, which is give to the creator of some resource. The authorization token must be protected, as it yields access to the resources. Therefore, many authorization systems use encryption to protect the contents and to validate the token is unchanged and thus still valid at the time of use. Securely sharing the authorization token is a key part of the strategy, as the token must not be allowed to escape. Thus, many authorization-based systems focus on assisting users of application in sharing authorization tokens with other users (possible of other applications). Also, authorization token may be modified to limit access (e.g. read-only memory) before being shared.

Prior art security mechanisms tend to focus on resource permissions. The typical example is file systems, where access permissions are set on files and folders. A user may be given read-only access to a folder; however, permissions for sub-folders and their files can be independently adjusted, such that a folder with write permission for everyone may appear nested with in a top-level restricted folder.

It will be appreciated that prior art access systems are tradeoffs between administrative overhead and security. Systems with high security tend to require a great deal administration with individuals and even groups assigned to the task of maintaining and enforcing the access policies. Systems without dedicated administrators tend to be of low security by providing permissions that are broader than necessary, allowing access control features to be easily or even accidentally circumvented, and relying upon user names and passwords which might fall into the wrong hands.

These and other limitations of the prior art will become apparent to those of skill in the art upon a reading of the following descriptions and a study of the several figures of the drawing.

SUMMARY

In an embodiment, set forth by way of example and not limitation, a secure electronic storage system includes an authentication gateway, a user/system interface coupled to the authentication gateway, a secure digital storage including a plurality of memory blocks (Containers) that store at least one information resource (Fact), wherein a target Container can only be accessed by a Fact comprising a valid authorization path (Authorization), and a memory controller coupling the user/system interface to the secure digital storage. In a non-limiting example embodiment, the memory controller is operative to: (a) manage the creation, sharing and unsharing of Containers; and (b) determine if a request to access a target Container includes a valid Authorization for that Container.

In an embodiment, set forth by way of example and not limitation, a computer implemented process for secure electronic storage includes authenticating a user, providing an authenticated user with access to an authenticated user account (Account) including information resources (Facts) including Authorizations, receiving a request including an Authorization to access a target Container; and determining if the Authorization allows for valid access to the target Container. The Authorization can include, by way of non-limiting example, a reference to a secure memory block (Container), access permission, an identifier (ID), and a termination flag. The Authorization may further include an embedded authorization path comprising an ordered list of authorization IDs that can be processed in a recursive manner.

In an embodiment, set forth by way of example and not limitation, a non-transitory computer readable medium including code segments implementing a process for secure electronic storage includes code segments authenticating a user to provide the user with access to a user account (Account) including at least one information resource (Fact) that comprises an Authorization, code segments receiving a request including the Authorization to access a target Container; and code segments determining if the Authorization allows for valid access to the target Container. Preferably, the Authorization has data structure including a reference to a secure memory block (Container), an access permission, an identifier (ID), and a termination flag.

An advantage of certain non-limiting examples is that fine-grained, secure and collaborative sharing of resources based on revocable, recursive delegation can be provided. "Fine-grained" refers to the fact that sharing can operate in terms of small bits of information, for example, limiting access to specific data sets (e.g. a table), or even specific facts (e.g. limited to some rows and/or columns of a table). Delegation is a method of sharing authorization, giving manageable access without giving one's password. It is ecosystem friendly, allowing sharing across boundaries (e.g. corporate & institutional) as it does not rely on a common system administrator to maintain roles and access rights. Recursive delegation allows some to whom you delegate to also delegate, e.g. to one of their subordinates or subcontractors; this is also known as sub-delegation. Revocable delegations, of course, allow for revocation, whether manually or automatically (e.g. by pre-established time). Further, when a delegation is revoked, the mechanism automatically revokes all related sub-delegations.

Resources are secured by delegation authorizations and the permissions they allow. There is no notion of ownership of resources, just the potential for varying access permissions and varying paths to the same resource. There are several forms of delegation. Personal delegation provide for short-term sharing (i.e. temporary access). Workgroups provide additional structure for longer-term collaborations. Workgroups delegate access as well, both to individuals and to other workgroups. The simplest form of workgroup delegation is membership in a workgroup.

Example systems described herein are applicable to complex information ecosystems that have multiple ownership boundaries and in which collaboration requires information to flow across these boundaries, treating the various parties as peers rather than subordinates that have an overarching system administrator. Collaboration continues to evolve. As it does, more initiatives find themselves crossing not just departmental boundaries, but corporate boundaries as well.

A number of business domains can benefit from example systems described herein for secure sharing, among them are adaptive and dynamic case management (ACM/DCM), collaborative model-based development, personal and office productivity, and project management. The Internet of Things (IoT) can make use of methods and systems described herein, as unlocking the full potential of the Internet of Things requires collaboration of information resources at unprecedented levels.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures.

DETAILED DESCRIPTION OF EXAMPLE EMBODIMENTS

Figure 1:
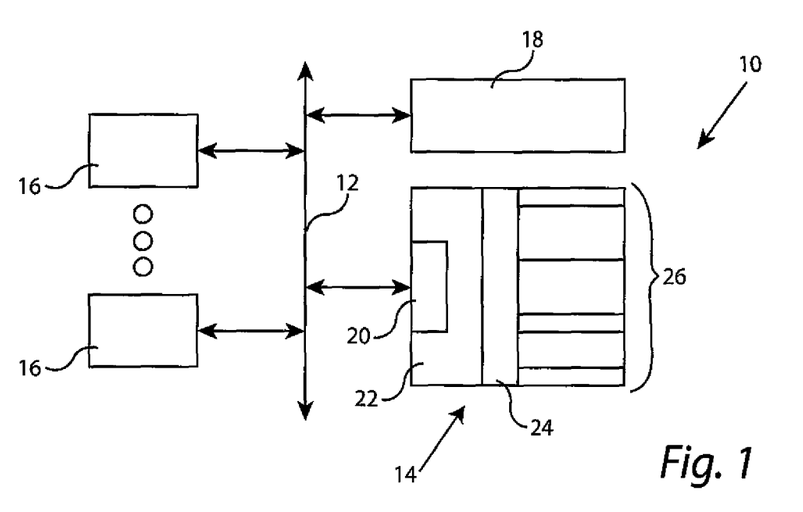
FIG. 1 is a block diagram of an example authorization path secured electronic storage system.

In FIG. 1, an authorization path secured electronic storage system 10, includes a network 12 and an authorization path memory sharing (APMS) server 14. One or more users 16 can access APMS server 14 via network 12. In alternate embodiments, one or more users 16 can access APMS server 14 directly, e.g. other than through network 12. In this non-limiting embodiment, a third party authentication system 18, shown here coupled to the network 12, can be used to authenticate users 16. In other embodiments, third party authentication systems may communicate directly with the APMS server 14, or may be omitted in favor of internal or external authentication systems of the APMS server 14.

Network 12 represents a computer or data network which allows computers (including personal computers, servers, and other computerized devices) to exchange data, typically transferred in the form of data packets. Network 12 can be a local area network (LAN), a wide area network (WAN), or any kind of network architecture which supports the computer or data network function. In this non-limiting example, network 12 comprises the Internet, where APMS server 14, users 16, and third party authentication system 18 communicate over the Internet using Internet protocols including TCP/IP (Transmission Control Protocol/Internet Protocol), HTTP (Hypertext Transfer Protocol), etc. Additional security can be provided with HTTPS (HTTP Secure), which is the HTTP protocol layered on top of SSL (Secure Sockets Layer) or TLS (Top-Level Specification) protocols. The main motivation for HTTPS is to provide additional authentication and to protect the privacy and integrity of exchanged data.

APMS server 14 comprises an authentication gateway 20, a user/system interface 22, a memory controller 24, and a number of memory blocks ("Containers") 26. The example Containers 26 are each generally a contiguous group of memory locations that are accessed only via a valid authorization path. In other embodiments, some or all of the memory blocks are virtual memory blocks comprising memory locations that are not contiguous, as will be appreciated by those of skill in the art. The Containers reside in digital memory comprising non-transitory computer readable media such as semiconductor, optical or magnetic memory systems, which can be part of, or coupled to, the APMS server 14.

Authentication gateway 20 provides access to the functionality of the APMS server by a user 16. In this non-limiting example wherein the network 12 comprises the Internet, a user 16 can access the authentication gateway 20 using Internet protocols. For example, the authentication gateway 20 and the user/system interface 22 can be implemented as webpages that can be accessed by a user 16 via a web browser, preferably with a secure protocol such as HTTPS. The authentication gateway 20 can allow a user 16 to enter, for example, a user name and password. However, this may compromise the authorization process by allowing a hacker to guess or steal the user name and password combination. To address such security and access procedures, a third party authentication system 18 can be used.

There are a variety of third party authentication systems that are compatible with Internet protocols including OAuth and OpenID. OAuth is an open standard for authorization that provides client applications a "secure delegated access" to server resources on behalf of a resource owner. It specifies a process for resource owners to authorize third-party access to their server resources without sharing their credentials. Designed specifically to work with HTTP, OAuth essentially allows access tokens to be issued to third-party clients by an authorization server, with the approval of the resource owner, or end-user. The client then uses the access token to access the protected resources hosted by the resource server. OAuth is commonly used as a way for web surfers to log into third party web sites using their Microsoft, Google, Facebook or Twitter accounts, without worrying about their access credentials being compromised. OAuth is a service that is complementary to, and therefore distinct from, OpenID (OID), which is an open standard and decentralized protocol by the non-profit OpenID Foundation that allows users to be authenticated by certain co-operating sites (known as Relying Parties or RP) using a third party service. This eliminates the need for webmasters to provide their own ad hoc systems and allowing users to consolidate their digital identities.

The user/system interface 22, in this non-limiting example, presents users with information about their accounts, including Containers to which they have authorization paths and well as providing users with the ability to create, share and unshare Containers. The memory controller 24 has logic which enforces the authorization function of the server including authorizing and identifying a target resource, given an authorization path.

Figure 2:
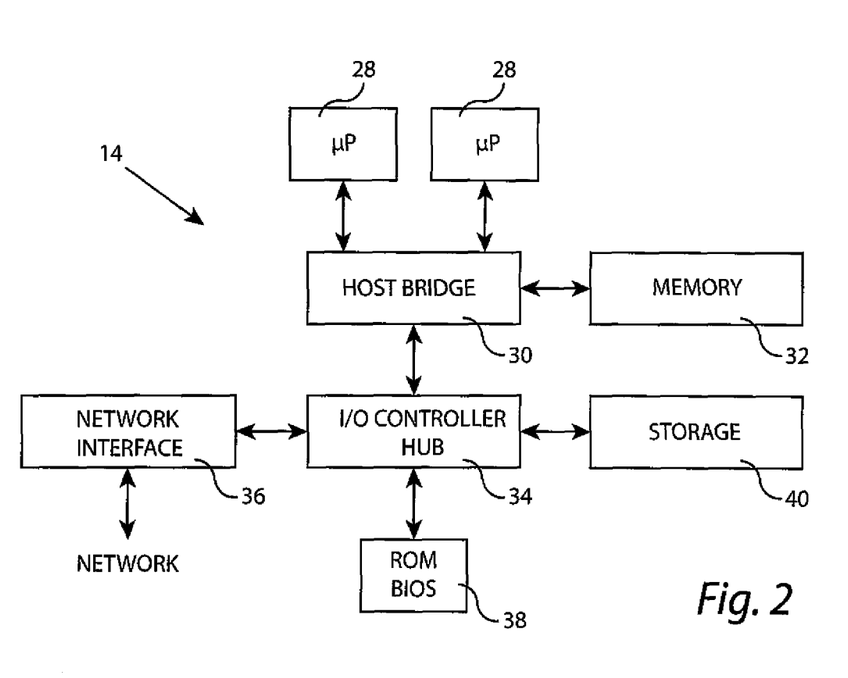
FIG. 2 is a block diagram of an example authorization path memory sharing (APMS) server of FIG. 1.

FIG. 2 is a block diagram, set forth by way of example and not limitation, of an APMS server 14 including one or more microprocessors (μP) 28, a host bridge 30, memory 32, an input/output (I/O) controller hub 34, a network interface 36, a Basic Input Output System (BIOS) 38, and storage 40. Microprocessors 28 can be provided by a number of vendors including Intel, AMD and others. Host bridge 30, sometimes referred to as "Northbridge", connects directly to the microprocessors 28 and is responsible for controlling high speed and high priority busses such as the memory bus and high speed graphics bus. Memory 32 is computer digital memory such as solid state read/write RAM memory. I/O controller hub 34, sometimes referred to as "Southbridge", provides a communication path to the microprocessors 28 via host bridge 30. Network interface 38 may be a wired or wireless interface to the Internet, e.g. via an Ethernet or WiFi connection. BIOS 38, often referred to as "ROM BIOS", is used, for example, upon the startup of the server 14 to provide a basic kernel of the server's operating system. BIOS 38 is non-volatile computer memory such as read only memory (ROM), flash memory, etc. Storage 40 is also generally a non-volatile computer memory such one or more magnetic ("hard") disk drives, optical disk drives, and semiconductor drives such as flash drives, etc. Memory 32, BIOS 38 and storage 40 are all examples of "non-transitory computer readable media" as set forth in the USPTO Notice "Subject Matter Eligibility of Computer Readable Media" by David J. Kappos dated Jan. 26, 2010. It is also to be noted that the one or more microprocessors 28, host bridge 30, I/O controller hub 34 and network interface 36 may include non-transitory computer readable media, for example in the form of registers and memories. Non-transitory computer readable media can be further accessed by server 14 via network interface 36, e.g. by a device coupled to the network 12.

Figure 3:
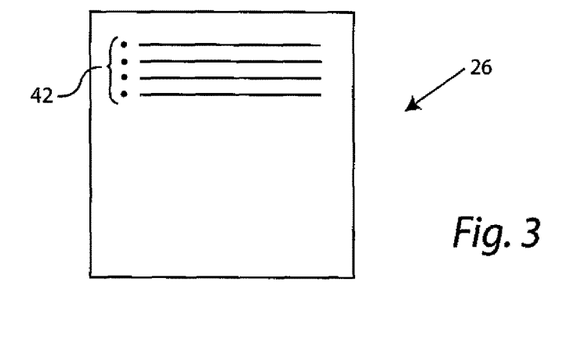
FIG. 3 is an illustration of an example memory block ("Container") of the APMS server of FIG. 1.

With reference to FIG. 3, APMS server 14 is used to securely share information resources ("Facts") 42 that are stored in a Container 26. In the present example, Facts 42 represent relations (e.g. logical assertions). In other embodiments, the Facts 42 may be strings or document storage (e.g. JSON), name-value pairs, or rows and columns.

A special type of Fact is an Authorization which includes:
A reference to a Container, visually represented by an arrow;
An access permission (e.g. read-only, read/write, etc.)
An identifier ("ID" or "id", e.g. id=X)
A termination flag
An optional embedded authorization path, which is an ordered list of authorization IDs (e.g. id=W[U]—this authorization has id of W and an embedded authorization path of [U])
An optional expiration expression
An optional list of associated Users or Workgroups The ID is a unique name of the authorization within its enclosing Container (note that it is not the name of the resource being referenced. The ID of the authorization need not necessarily be kept secret, because knowing one does not enable access for another user. The system manipulates authorizations on behalf of user request to create, share and unshare; authorizations are protected by the system and are not otherwise user manipulable.

Figure 4A:
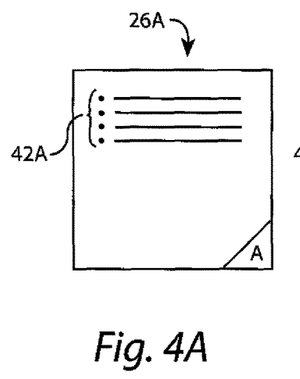
FIGS. 4A, 4B and 4C illustrate three example-types of the Container of FIG. 3.
Figure 4B:
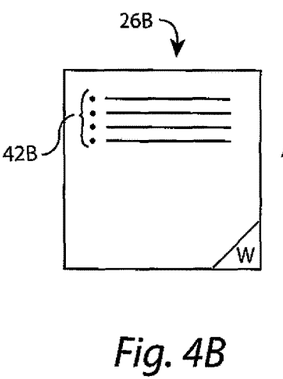
Figure 4C:
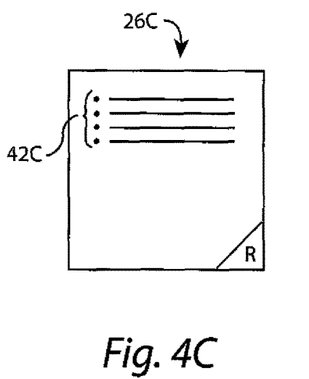

FIGS. 4A-4C illustrate several example types of Containers 26. In FIG. 4A, an authenticated user account Container ("Account") is illustrated. Accounts, like all Containers, store Facts and, in particular, Accounts store authorization Facts ("Authorizations"). FIG. 4B illustrates a Container for a group of authenticated users ("Workgroup"), which also stores Facts including Authorizations. Workgroups are used to create structures for managing a variety of collaborative and sharing scenarios. FIG. 4C illustrates a Container for Facts other than Authorizations ("Repository") and, as such, is a terminal resource. There are no restrictions on user editing of Repositories, making them easy to backup, download and restore.

Figure 5:
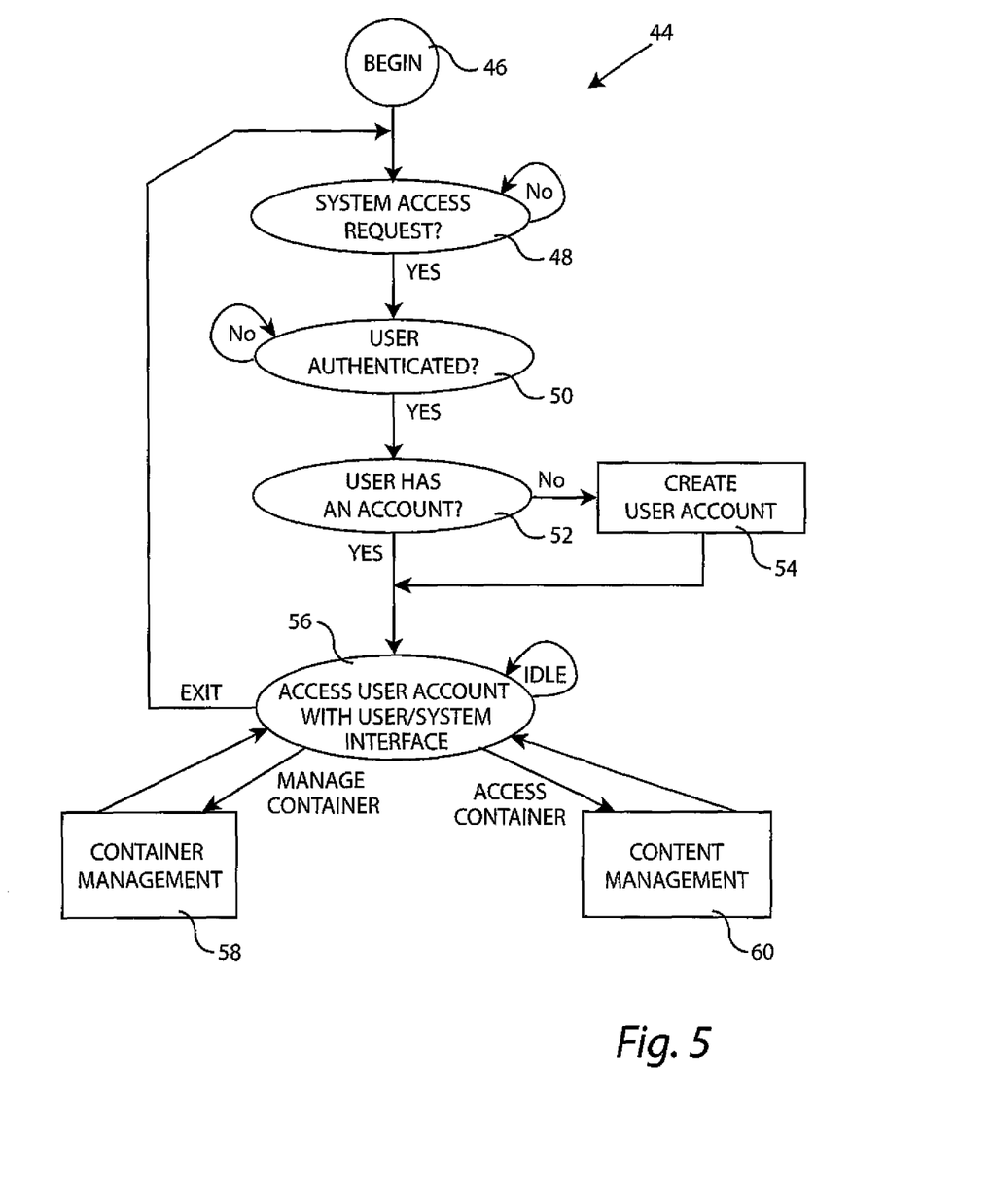
FIG. 5 is a flow diagram of an example system process for providing authorization path access to Containers.

In FIG. 5, a flow diagram of a memory controller 24 process 44 for providing authorization path Container access begins at 46 and, in an operation 48, it is determined if there is a system access request by a user. If not, operation 48 idles. If there is a system access request, an operation 50 determines if the user is authenticated. If yes, an operation 52 determines if the authenticated user has an account. If not, an operation 54 creates a new authenticated user account ("Account") before an operation 56 provides Account access via the user/system interface 22. The operation 56 idles until receiving an input from the authenticated user. For example, operation 56 can receive a request from the authenticated user to manage one or more Containers, which is processed by Container Management operation 58, or a request from the authenticated user to access a container, which is processed by a CONTENT MANAGEMENT operation 60.

Figure 6:
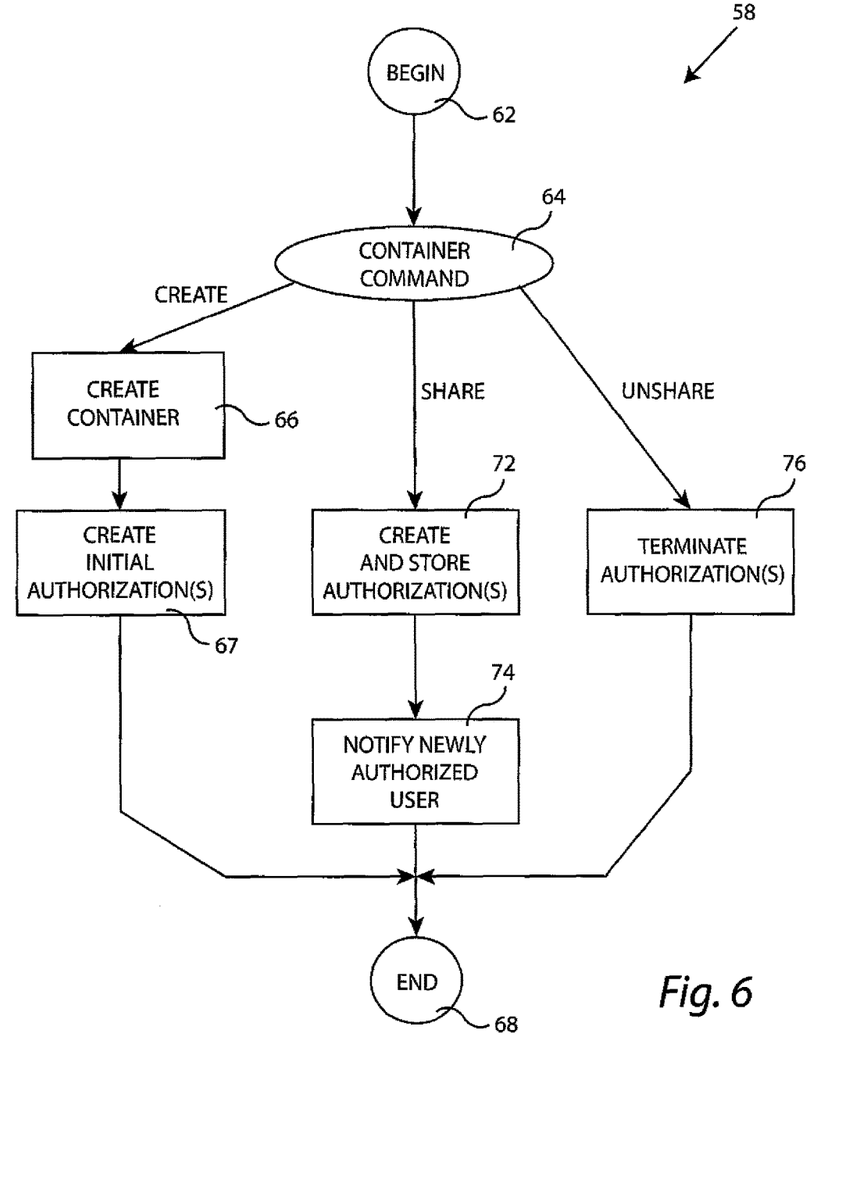
FIG. 6 is a flow diagram of an example Container Management process of FIG. 5.

In FIG. 6, an example Container Management process 58 begins at 62 and, in an operation 64, a container command is determined to be one of CREATE, SHARE OR UNSHARE. An operation 66 carries out the CREATE process and an operation 67 creates initial Authorization(s), after which the container management process 58 ends at 68. If the operation is SHARE, an operation 72 creates and stores one or more Authorizations (e.g. in a user's Account and/or in a Workgroup), and an optional operation 74 is used to notify an authorized user their newly created Authorization(s). For example, the authorized user can be informed via email. Alternatively, the authorized user can learn of their new Authorization(s) when they next log into their Account. An operation 76 is used UNSHARE, e.g. by terminating an authorization path (along with any related permissions), thereby revoking the previously authorized user's access to the container.

The SHARE operation 72 implements an advantageous feature of this example embodiment, namely, the delegation of an accessible resource to another (e.g. a subordinate, co-worker, subcontractor, other outsider, etc.) without sharing the authorized user's password and without requiring the services of a common system administrator to maintain roles and access permissions. Furthermore, the process can operate recursively so that an authorized user can delegate someone to work on his/her behalf, and they can similarly also delegate, and so forth. It should be noted that the UNSHARE operation 76 (which is essentially a revocation of authorization) is straightforward and, like the SHARE operation 72, can also operate recursively. However, in this non-limiting example embodiment, an UNSHARE of a delegated resource of an Authorization also terminates any subsequent delegation that was made using that Authorization. Therefore, in this non-limiting example, an UNSHARE operation does not require recursively updating Authorizations since "un-sharing" designates a single Authorization as no longer valid, prohibiting any subsequent use of that Authorization, including any recursively applied delegations to others from that Authorization.

In this example embodiment, delegating an Authorization ("sharing") from one user to another is a two-step process: 1) a first user creates Authorizations in one or more containers (see, e.g., operation 72 of FIG. 6); and 2) the first user sends a second user an authorization invitation (see, e.g., operation 74 of FIG. 6). In this non-limiting example, authorization invitations go into the second user's messages (e.g. an email account) rather than directly into their Account (if any). In this example embodiment, the second user has the opportunity to manage the authorization invitation, e.g. to reject it, accept it, rename it, categorize it, etc.). This example process prevents the first user from directly causing the second user's Account to be modified, and also provides a place for invitations for users not yet on the system (e.g. user's that do not yet have an Account).

Figure 7:
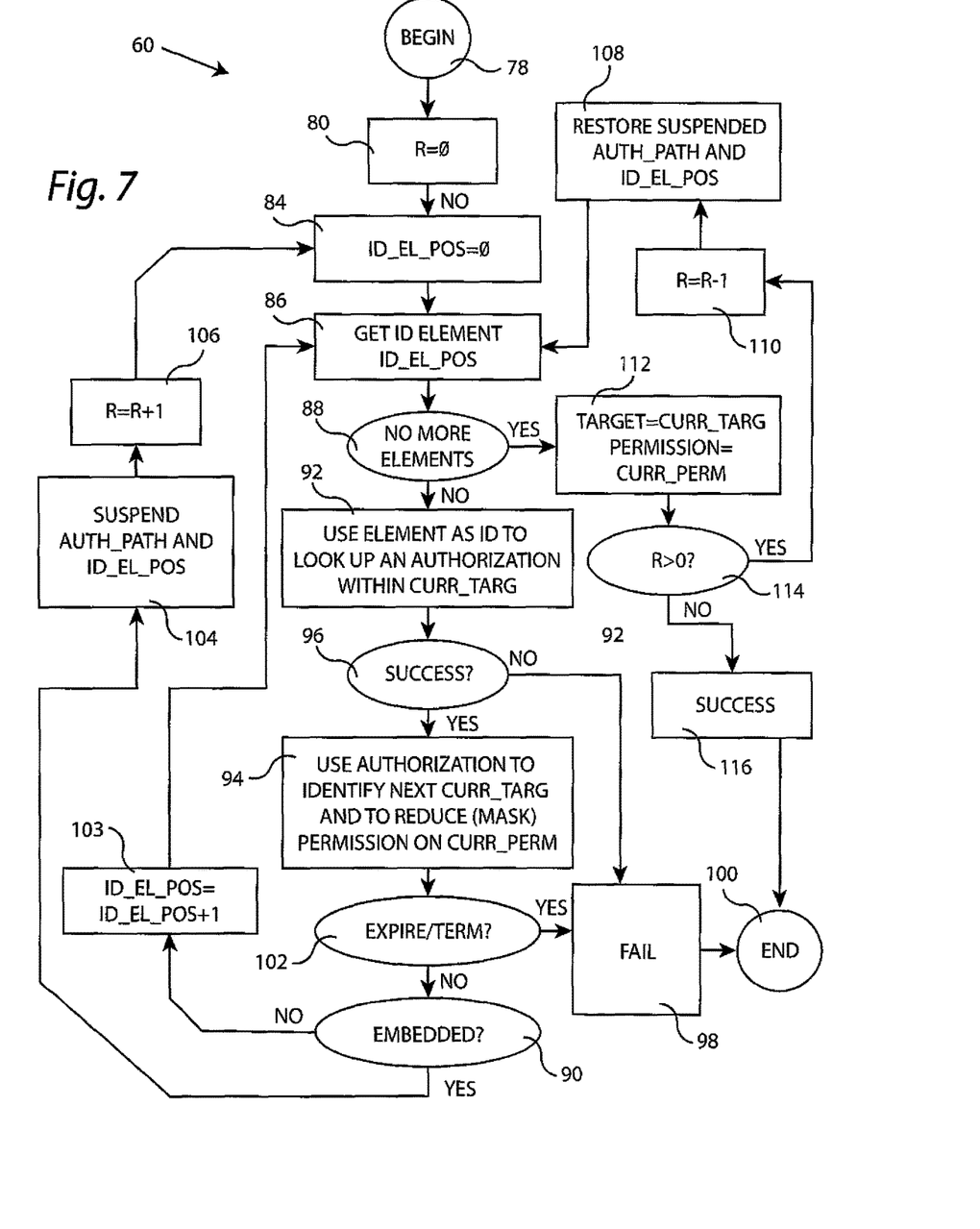
FIG. 7 is a flow diagram of an example AUTHPATH process of FIG. 5.

FIG. 7 is a flow diagram, set forth by way of example and not limitation, of AUTHPATH process 60 of FIG. 5. AUTHPATH process 60, in this non-limiting example, is a computer implemented process capable of recursive calls. Users interact with the system by making requests (e.g. queries or commands), where each request is accompanied by an appropriate authorization in the form of an authorization path (or multiple authorization paths as appropriate for the specific request). An authorization path (or "AUTH_PATH") is an ordered list of authorization ids (Authorizations). The authorization path both authorizes the request and identifies the target resource (e.g. a Container) upon which the query or command will operate. For example, using previous examples, if a user wishes to make a query against a Repository, they can supply one authorization path listing ids W and R in the form of [W,R]. In non-limiting examples, authorization ids are bytes or strings of data, and an authorization path can take the form of a URL query string or as form data associated with a request.

In FIG. 7, the process begins at 78 and, in an operation 80, a recursive counter "R" is set to zero. Next, an operation 84 sets the variable ID_EL_POS (the id element position in the authorization path) to zero. An operation 86 retrieves the next id element at position ID_EL_POS. If there are id elements to be processed as determined by an operation 88, an operation 92 uses the id element in an attempt to lookup an Authorization within the current target (CURR_TARG). If the Authorization lookup attempt of operation 92 fails, as determined by operation 96, the process 60 has failed and is processed accordingly at 98 before ending at 100. Otherwise, an operation 94 uses the Authorization retrieved in operation 92 to determine the next current target (CURR_TARG) and reduces (masks) the current permissions (CURR_PERM). Next, an operation 102 determines if there was an expiration or termination event and, if so, the failure is again processed at 98 and the process 60 ends at 100. If operation 102 determines that there wasn't an expiration or termination event, an operation 90 determines if the element includes an embedded Authorization path. If not, an operation 103 increments the variable ID_EL_POS and process control is returned to operation 86 to obtain the next id element.

As noted previously, the example embodiment of the AUTHPATH process 60 provides for recursive calls. For example, when operation 90 determines that there is an embedded authorization path in an element, an operation 104 suspends the current AUTH_PATH and ID_EL_POS parameters, which can be placed, for example, in a last-in-first-out (LIFO) memory stack. The recursive level R is then incremented by one in an operation 106, and control is returned to operation 84 to start processing the recursive call.

When operation 88 determines that it has reached the end of an authorization path, the target is set to the CURR_TARG and the permissions PERMISSION is set to the CURR_PERM. An operation 114 then determines if R>0 (e.g. there is some suspended processing). If so, the recursive level R is decremented by one in an operation 110 and an operation 108 restores the suspended AUTH_PATH and ID_EL_POS parameters before returning control to operation 86. If there is no suspended processing as determined in operation 114 the AUTHPATH process 60 was successful and is processed as such by operation 116 before terminating at 100.

It will therefore be appreciated that, in the above example, the AUTHPATH process is carried out by the system to authorize and identify a target resource, given an authorization path. The input is an authorization path (AUTH_PATH), and the output is either success (along with an identified target and access permissions) or failure. The process of this non-limiting example maintains state with two variables: 1) the current-target (CURR_TARG), which is a reference to a Container, the first of which is the authenticated user's Account logical container; and 2) the current permissions (CURR_PERM), which is a permissions bit set, the first of which is full permission. The process uses each element of the authorization path (AUTH_PATH), in turn, to provide an id used to lookup an authorization in the latest current-target. Upon success, the located authorization provides: 1) the next current-target ("next CURR_TARG"); and 2) the next current-permissions ("next CURR_PERM"). The example AUTHPATH process also performs expiration and termination processing, each of which can either pass or fail.

The presence of an embedded authorization path in an authorization temporarily suspends processing of the current authorization path ("current AUTH_PATH") and, after updating the variable state, automatically initiates recursive processing with the embedded authorization path ("embedded AUTH_PATH"). Upon the successful completion of the embedded authorization path, the most recent suspension is resumed, using the latest current-target and current permissions. When the AUTHPATH process is complete (e.g. all elements in the authorization path were successfully looked-up and there are no suspended processes to perform), then the latest current-target and the latest current-permissions will provide secure, permission-level access to the target container. In this non-limiting example, any failure, e.g. to find a matching authorization or due to expiration/termination, will cause the query or command to fail, thereby terminating the AUTHPATH process with no target being identified.

It should be noted that embedded authorization paths are hidden from the consuming user's perspective in this non-limiting example. Processing an embedded authorization only consumes one element of the outer authorization path (e.g. the one that is being suspended, such as the one supplied by the user with the request), such that the user of such an authorization does not have access to, and is not aware of, the various containers that are automatically traversed in the processing of the embedded authorization. This feature provides additional security to the system by making Containers that are not relevant to the user's request essentially invisible to the user.

Figure 8:
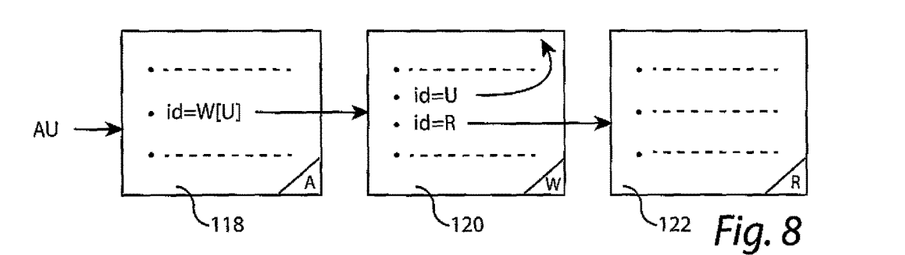
FIG. 8 is an illustration of an example CREATE CONTAINER process of FIG. 6.

FIG. 8 is an illustration, set forth by way of example and not limitation, of the CREATE CONTAINER operation 66 of FIG. 6. In this example, an authenticated user "AU" accesses his/her Account via a web browser using a web-based authentication system, e.g. an OAuth 2.0 login service provided by Google Plus, Windows Live, Facebook, etc. Other authorization systems and access through other interfaces than a web browser are used in alternate example embodiments. As noted previously, the AU's Account stores Facts and, more particularly, Authorizations. The AU has full access to their own Account such that they can both use it on their own behalf and also to delegate their Authorizations to others.

In this non-limiting example, the AU is not only creating a Repository, but also a Workgroup to help manage collaboration of the Repository. As noted previously, a Workgroup is a Container that can store Facts and Authorizations. Workgroups are useful in that they provide a structure for managing a variety of collaboration and sharing scenarios, and can survive the termination of the authorization of the AU that created it. Therefore, a Workgroup is, in some ways, like an artificial "user", in the way that a corporation can be considered and artificial person independent of the person(s) who created it.

The Repository, as noted previously, is a Container that stores Facts but not Authorizations. Repositories are not technically required data constructs in that Workgroups can also store Facts. Repositories are convenient, however, in that they are terminal resources because they don't store any Authorizations to other Containers and, as such, there are no restrictions on AUs editing the Facts in the Repository. This makes the Repository easy to backup/download and restore in its entirety.

FIG. 8 includes several example Authorizations. For example, an Account 118 for user AU includes the Authorization id=W[U], which refers to a Workgroup 120, and which contains an embedded authorization path consisting of the single element U. In Workgroup 120, Authorization id=R references a Repository 122, which provides access to the Repository 122 to any user who has access to Workgroup 120. Also in Workgroup 120, the authorization id=U references the Workgroup 120 itself, and is used for membership. This type of Authorization is associated with a user or workgroup (not illustrated here).

Figure 9:
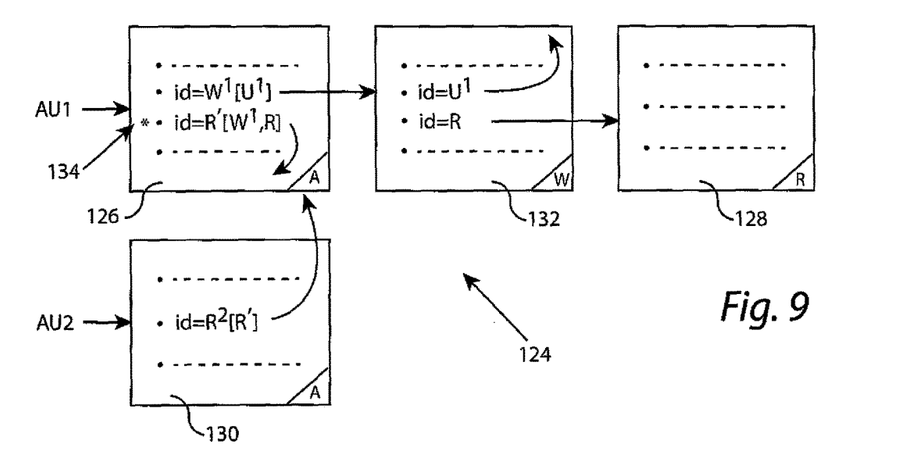
FIG. 9 is an illustration of an example process for creating personal delegations.

FIG. 9 illustrates an example personal delegation process 124. In this illustration, a first authorized user AU1, having an Account 126, uses personal delegation to give access to a Repository 128 via a Workgroup 132 to a second authorized user AU2 having an Account 130. The system duplicates AU1's Authorization id=$W^1[U^1]$ to form the new authorization id=$R'[W^1, R]$ in AU1's Account 126. R' may have equal or lesser access permissions ("Permissions") than $W^1$, at the discretion of AU1. For example, R' may have read-only permissions with respect to Repository 128. R' is associated with AU2 in AU1's Account, which provides AU1 with management capabilities, such as revocation of this delegation and enumerating delegations and delegates. In this example embodiment, the APMS server 14 of FIG. 1 can be implemented as a web server such that the AU1's Account 126 can be presented to AU1 as a web page with navigation to authorization-accessible resources via URLs, other forms of links, etc.

For user AU2, $R^2$ only gives access to Repository 128, not to AU1's Account 126 and not to the Workgroup 132. In order to use the Authorization, and access the Repository 128, AU2 would have to use an authorization path in the form of a list having just one authorization id, e.g. [$R^2$]. Upon using $R^2$, the authorization function automatically (and hidden from AU2) follows R' after locating AU1's Account 126 as referenced by R. The function also automatically (and hidden from AU2) follows $W^1$ to Workgroup 132, and then R to the Repository 128.

A second delegation by AU1, e.g. to a third authorized user AU3, of the same access to Repository 128 creates another duplicate of $W^1$ to be associated with AU3 (not shown), e.g. id=$R''[W^1,R]$ and stored as an Authorization in AU1's Account. It is noted that R' can also be shared by AU2 and AU3 in certain alternative embodiments, but this conflates delegations and revocations.

It should also be noted that, in this non-limiting example, user AU1 can also use R' and will have and see the same access that was given to user AU2, or use R" and have the same access that was given to user AU3. For example, if AU2 is given read-only access, this will ensure that AU1 can self-enforce read-only access by using R'. Alternatively, user AU1 can create a read-only delegation of his or her own as well. While this non-limiting example illustrates a personal delegation to an individual, it should be noted that personal delegations can also be made to workgroups.

AU1 can manually revoke its personal delegations, e.g. the personal delegation to AU2 to access the Repository 128, by simply marking the delegation R' as "terminated", as illustrated by the asterisk 134 in AU1's Account 126 next to AU2's delegation Authorization id=R'[$W^1$, R]. This revokes all access through this Authorization including AU2's $R^2$ as well as any further delegations made by AU2 that were based upon $R^2$. In this non-limiting example, the Authorization is not deleted from AU1's Account, which prevents the id from be reused and supports later reinstatement, if desired, by "unterminating" the Authorization.

Figure 10:
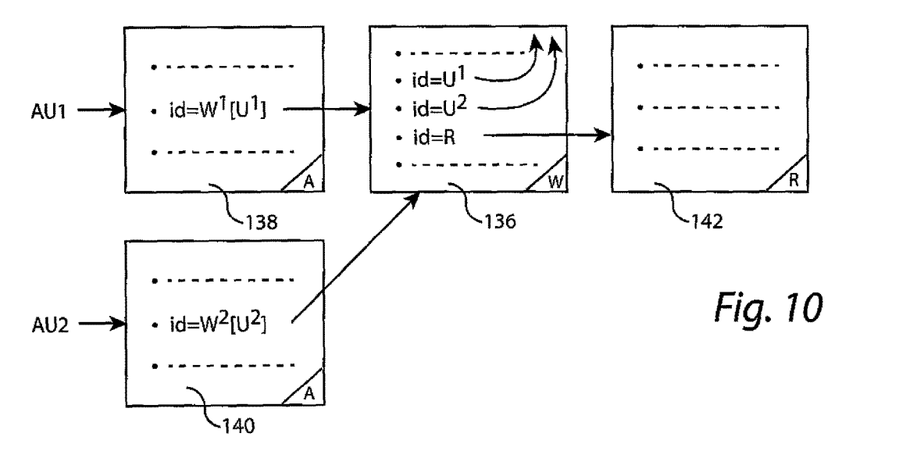
FIG. 10 is an illustration of an example of how Workgroups can provide structure for managing sharing.

FIG. 10 illustrates how Workgroups can provide structure for managing sharing. Workgroups, like Accounts, in this example can delegate, including a special form of delegation known as "membership." That is, an authorized user that has mutable management permission access to a Workgroup ("the joined Workgroup") may invite another authorized user or Workgroup ("the joining Workgroup"). This results in a new authorization for that user or joining workgroup, giving them either the same or lesser access to the joined Workgroup. As with personal delegation (see above), the system also clones an authorization with in the joined Workgroup, which is associated with the user or joining Workgroup, along with their access permissions.

In the example of FIG. 10, two authorized users (AU1 and AU2) are both members of Workgroup 136. AU1 can access the Workgroup 136 by supplying the authorization path [$W^1$] with a request. AU2 can access the same Workgroup 136 by supplying the authorization path [$W^2$]. Similarly, AU1 can access a Repository 142 by supplying the authorization path [$W^1$, R] with a request and AU2 can access the same Repository 142 by supplying the authorization path [$W^2$, R] with a request. Again, in this non-limiting example, the system can be implemented as a web server such that Accounts and Workgroups can be presented as navigable web pages.

It should be noted that in the above example, AU1 and AU2 may have different access permissions. E.g. AU1 may have mutable management access and AU2 may have read-only access. In this example, AU1 can remove (revoke) AU2's membership in Workgroup 136 since it has mutable management capability, while AU2 cannot since it does not have mutable management capability.

A user having mutable management capability may have a Workgroup delegate access an accessible resource (e.g. Repository 142) to another user or Workgroup. This is similar to joining a Workgroup, except that the embedded authorization path prevents access to the Workgroup itself, enabling access only of a subsequent target, instead of id=$U^2$ as in the previous example. In this non-limiting example, AU1 provides AU2 with access to the Repository 142 but not to the Workgroup 136 itself with the Authorization id=$U^2$[R]. Therefore, as in the example of FIG. 9, AU1 gives AU2 delegated access to a Repository but, because it is a Workgroup delegation rather than a personal delegation, it survives AU1 leaving Workgroup 136.

The capabilities of the system as described above can be combined. For example, multiple Workgroups can be linked to form desired sharing structures. Furthermore, the assemblies can be statically created and relatively unchanging, or dynamically adjusted (e.g. grown or shrunk) as desired during the life-cycle of the collaboration.

Figure 11:
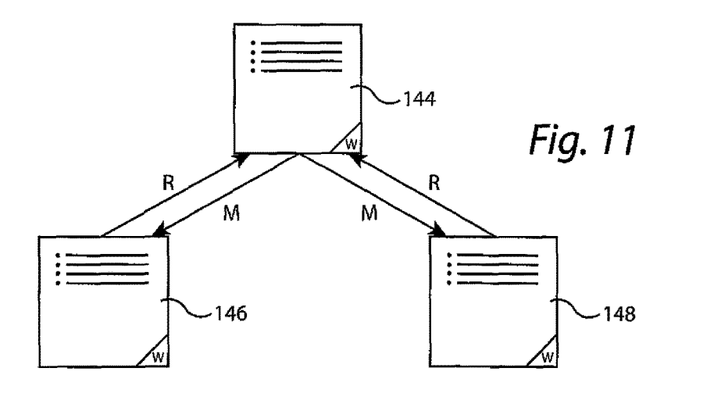
FIG. 11 is an illustration of an example Workgroup hierarchy.

In FIG. 11, three Workgroups have been set up in a hierarchy with an upper Repository 144 and two lower or "neighbor" Repositories 146 and 148. This can be useful, for example, to support decomposition of collaboration by sub-collaboration or subproject. The example of FIG. 11 provides top-down management capabilities along with read-only access to the whole project for any members at any levels, where the arrows labelled "M" indicate Authorizations having mutable access and the arrows labelled "R" indicate Authorizations having read-only access. It should be noted that Repositories can be attached to, and authorized users can be associated with, one or more of the Workgroups.

The example hierarchical structure for Workgroups, as illustrated in FIG. 11, allows a collaborative project to the subdivided into sub-projects. Any authorized user having at least read-only access to a lower Repository 146 or 148 can also access the upper Repository with read-only permission due to the upward authorizations R, and can also access a neighboring Repository (148 or 146, respectively) due to the combination of an upward authorization R and a downward authorization M. It should be noted that, in this non-limiting example, the downward authorizations M, if accessed via an upward authorization R, will be read-only because subsequent authorization levels are subject to previous authorization levels. It should also be noted that many other hierarchical structures can be employed, e.g. additional levels, omitting a link, or introducing a direct link between Workgroups at the same level ("peers").

In certain non-limiting examples, an access-permission ("Permission") can be used to support a variety of access scenarios. A Permission can, for example, be represented by a bit ("1" or "0") in a Permission Word. Permissions can be combined, for example, using masking (e.g. a logical AND). For example, the authorization function can use masking in a way that effectively strips permissions.

Membership management is a Permission that applies to Workgroups, and refers to the ability to manipulate authorization facts by asking the system to perform sharing or un-sharing operations. By way of non-limiting examples, a management-read allows reading a Workgroup's Authorizations to yield a list of memberships and delegations, and a management-write (e.g. the combination of manage-create, manage-read and manage-update) allows adding or removing members and delegations.

Content is a Permission that allows for the manipulation of facts other than authorization facts (e.g. content). Content-read allows reading of non-authorization facts in Workgroups and any facts in Repositories, and content-write (e.g. the combination of data-create, date-read and data-update), allows the editing of any non-authorization facts in Workgroups and any facts in Repositories.

In certain example embodiments, the AUTHPATH function ensures that when using an Authorization with read-only permission that a user cannot modify the target resource, or any other resources otherwise reachable by that Authorization. For example, when using an Authorization with read-only permission is used to reach nested/subordinate, enclosing/superior, or adjacent/sibling resources, those resources are also read-only to the user even when those other resources are mutable to other users. This prevents the problem of exposing a nested resource to being mutable to those that should only have read-only access to such a resource. Also, various combinations can be made in certain non-limiting examples, such as mutable management permission (e.g. permission to invite or remove others in a Workgroup) along with read-only data permission so that published content cannot be deleted.

Other Permissions can be available in certain embodiments. By way of non-limiting examples, an Expiration Criteria can be assembled as expressions using several operators, an Expiration Date can be specified past which Authorization ceases, and/or Expiration Use Count can, for example, be stored in a delegator's Account or Workgroup to specify a use count after which authorization ceases. In further non-limiting examples, logical operators such as "AND" and "OR" can be used to express combinations of Permissions.

As it is used in the prior art, "data virtualization" refers to any approach to data management that allows users to retrieve and manipulate data without requiring technical details about the data, such as how it is formatted or where it is physically located (i.e. the logical location is abstracted). Using layering of the same abstraction, data from various data sources can be joined to appear to be a single data source, by way of example. As used with certain example embodiments herein, "Data Virtualization" includes the traditional functionalities of data virtualization as set forth above and further includes repeating or virtualizing the data itself (i.e. the data itself is abstracted). For example, a single data set can be shared by multiple users, each of whom believe that they have exclusive access to the data or has their own, separate copy of the data. A specific example is having multiple lists of contacts (or perhaps a single list of contacts that are distinguished by category of memberships), and sharing only one of those lists with an application or service that expects access to the contacts. As another example, data consumers and providers, e.g. sources and sinks, that can be plugged together with the ability to give a partially trusted application what appears as full access to a user's photos, while really only giving them access to a defined subset, and with defined permissions. Therefore, the term "Data Virtualization" as used herein includes the ability to obscure, limit, and/or redirect a data consumer (user). Filtering, by data type or by column as in relational projection and/or by instance or row as in relational selection, joining (in the sense of the relational join), and transforming are provided in non-limiting example embodiments. A request, for example, may specify an explicit query (or transforming command). Such a query can be encapsulated within an Authorization that can limit access to users of the Authorization. As the trust of the user ("consumer") of the Authorization increases, the Authorization can be edited to give access to a greater amount of data or to have update permission. Also, an authorization encapsulated query can limit access by projection (limiting by types or columns) or selection (limiting by instances or rows), or both together.

In certain non-limiting example embodiments, information from different Containers ("data sources" or "targets") can be joined together. For example, a user may wish to query two different data sources simultaneously. This can be accomplished by specifying multiple authorization paths to identify multiple targets in the request query or command. In other situations, a user may desire a unified view of several underlying data sources, which can be accomplished with an Authorization referring to multiple targets. At times, it may be desirable to share that there are multiple underlying targets with authorized users, and at other times it may be desirable to hide that information.

By way of non-limiting example, a shared virtual view can be provided pursuant to a request (a/k/a "query" or "command") specifying multiple targets with multiple Authorizations. This can be used in specifying a virtual joining of the data from multiple Containers. Elements of the query or command can specify for which of the multiple Authorizations they are intended. Also, an expression construct allows for sub-selection from a multiple authorization path target. Another expression allows for the joining of two Containers.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A computer implemented process for secure electronic storage comprising:
   authenticating a user to provide the user with access to a user account including at least one information resource that comprises an Authorization including
   (a) a reference to a secure memory block,
   (b) an access permission,
   (c) an identifier (ID),
   (d) a termination flag, and
   (e) an embedded authorization path comprising an ordered list of authorization IDs;
   receiving a request including an authorization path to access a target secure memory block; and
   determining if the Authorization allows for valid access to the target secure memory block.

2. A computer implemented process for secure electronic storage as recited in claim 1 wherein the process maintains a state with a current-target secure memory block variable and a permission bit set.

3. A computer implemented process for secure electronic storage as recited in claim 1 wherein an embedded authorization path is processed recursively.

4. A computer implemented process for secure electronic storage as recited in claim 1 wherein the Authorization further includes an expiration expression.

5. A non-transitory computer readable medium including code segments implementing a process for secure electronic storage comprising:
   code segments authenticating a user to provide the user with access to a user account including at least one information resource that comprises an Authorization data structure including
   (a) a reference to a secure memory block,
   (b) an access permission,
   (c) an identifier (ID),
   (d) a termination flag, and
   (e) an embedded authorization path comprising an ordered list of authorization IDs;
   code segments receiving a request including an authorization path to access a target secure memory block; and code segments determining if the Authorization allows for valid access to the target secure memory block.

6. A non-transitory computer readable medium including code segments implementing a process for secure electronic storage as recited in claim 5 wherein the process maintains a state with a current-target secure memory block variable and a permission bit set.

7. A non-transitory computer readable medium including code segments implementing a process for secure electronic storage as recited in claim 5 wherein an embedded authorization path is processed recursively.

8. A non-transitory computer readable medium including code segments implementing a process for secure electronic storage as recited in claim 5 wherein the Authorization further includes an expiration expression.

* * * * *